July 22, 1969      J. ZIMMER      3,456,494
METHOD AND APPARATUS FOR DETERMINING THE VISCOSITY OF FLUIDS
Filed Aug. 16, 1966      2 Sheets-Sheet 1
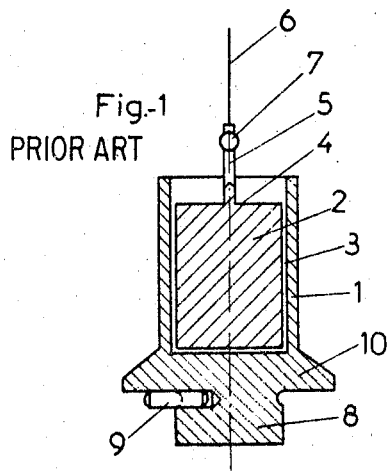
Fig.-1 PRIOR ART
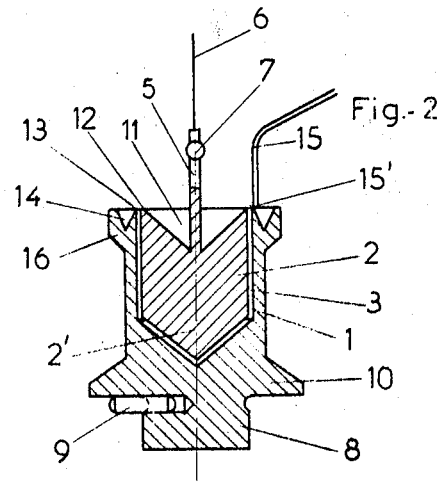
Fig.-2
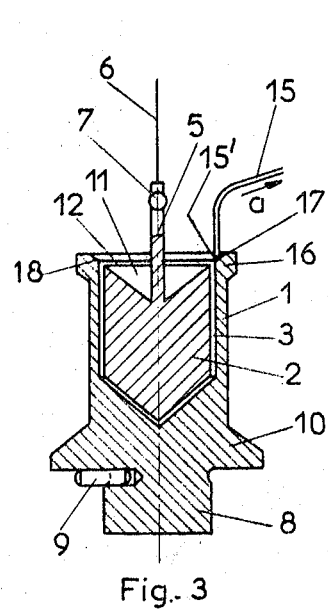
Fig.-3
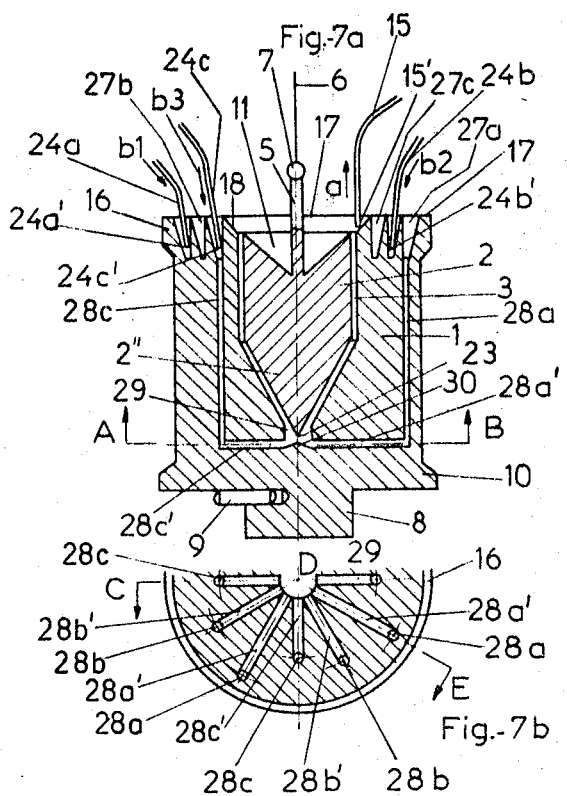
Fig.-7a
Fig.-7b
Inventor
Joseph Zimmer
by Michael S. Striker
Attorney July 22, 1969   J. ZIMMER   3,456,494
METHOD AND APPARATUS FOR DETERMINING THE VISCOSITY OF FLUIDS
Filed Aug. 16, 1966   2 Sheets-Sheet 2

Inventor
Joseph Zimmer
by Michael S. Striker
Attorney

United States Patent Office 3,456,494
Patented July 22, 1969

3,456,494
METHOD AND APPARATUS FOR DETERMINING THE VISCOSITY OF FLUIDS
Joseph Zimmer, 2 Rue du Canal,
Illkirch-Graffenstaden, France
Filed Aug. 16, 1966, Ser. No. 572,732
Claims priority, application France, Mar. 17, 1966,
8,558
Int. Cl. G01n 11/00
U.S. Cl. 73—60                                    34 Claims

ABSTRACT OF THE DISCLOSURE

A method and apparatus for measuring the viscosity of a fluid in a gap between a rotating container and a body concentrically arranged in the container and suspended on a wire so that the fluid in the gap will transmit a torque to the body whose magnitude is indicative of the viscosity of the fluid.

---

The present invention relates to a method and apparatus for determining the viscosity of fluids. More particularly, the invention relates to improvements in so-called Couette viscometers.

It is an important object of the invention to provide a method and apparatus for determining the viscosity of gases or liquid with a high degree of accuracy.

Another object of the invention is to provide an improved Couette viscometer which can be utilized to determine the viscosity of individual samples of a fluid medium or for determining the viscosity of fluid streams.

An additional object of the invention is to provide a method and apparatus for determining the viscosity of fluids which are in the process of being mixed or reacting with each other.

A further object of the invention is to provide a method and apparatus for determining the viscosity of two or more fluids in a continuous operation and in any desired sequence.

Still another object of the invention is to provide a viscometer which can be utilized to regulate the operation of machines or apparatus serving to produce or process a fluid.

A concomitant object of the invention is to provide a viscometer which can be utilized to determine the viscosity of a large variety of gaseous or liquid media, which can be utilized in laboratories, chemical and other plants, research institutes and all such establishments wherein accurate determination of viscosity is desirable.

Briefly stated one feature of the present invention resides in the provision of a method of determining the viscosity of fluids in a measuring chamber between a first surface and a second surface which latter is concentric with and surrounds the first surface. The method comprises the steps of admitting a fluid to be tested into the measuring chamber, rotating one of the surfaces with reference to the other surface, preferably at a constant speed, whereby the fluid tends to transmit to the other surface a torque whose magnitude is indicative of viscosity of such fluid, and continuously aspirating the fluid above a predetermined level in the measuring chamber to thereby control the surface tension of fluid. Such aspirating step may include placing between the two surfaces or above the one and/or the other surface one or more aspirating orifices to evacuate surplus fluid and to produce a current of air which flows along and agitates the upper surface of fluid to thus prevent development of surface tension.

The fluid may be admitted continuously or in batches. If admitted continuously, the stream of fluid is preferably introduced into the lowermost zone of the measuring chamber and is withdrawn at the aforementioned predetermined level, preferably by the same orifice or orifices which aspirate surplus fluid and generate the currents of air to destroy surface tension.

The fluid medium to be tested may be a single type of fluid or a mixture of two or more fluids which react with each other in the measuring chamber whereby the determination of viscosity also furnishes measurements indicating variations in viscosity in the course of reaction. Two or more fluids may be introduced seriatim and without interruption. For example, a first fluid may be followed by a solvent and thereupon by a rinsing agent, again by the first fluid, by the solvent, and so forth.

The novel features which are considered as characteristic of the invention are set forth in particular in the appended claims. The improved viscometer itself, however, both as to its construction and its mode of operation, together with additional features and advantages thereof, will be best understood upon perusal of the following detailed description of certain specific embodiments with reference to the accompanying drawings, in which:

FIG. 1 is an axial section through a conventional Couette viscometer;

FIG. 2 is an axial section through a viscometer which embodies one form of the present invention and is utilized to determine the viscosity of individual samples of a fluid medium;

FIG. 3 is a similar axial section through a second viscometer which is also utilized for determining the viscosity of individual samples;

FIG. 7a is an axial section through a fourth continuously operating viscometer, substantially as seen in the direction of arrows from the composite line C—D—E of FIG. 7b;

FIG. 7b is a fragmentary horizontal section as seen in the direction of arrows from the line A—B of FIG. 7a.

Figure 4:
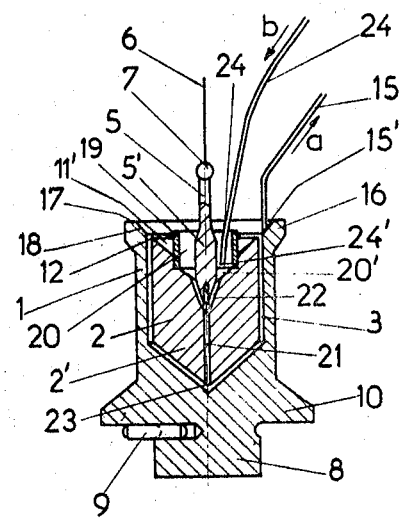
FIG. 4 is an axial section through a continuously operating viscometer which may be utilized for determining the viscosity of a fluid stream.

The apparatus shown in FIG. 1 is known as a Couette viscometer. It comprises a first component in the form of a container or cup 1 which is consttiuted by a hollow cylinder, and a second component including a mass or pendulum 2 which extends into and is coaxial with the cup 1. The mass 2 is constituted by a solid cylinder and its diameter is slightly smaller than the internal diameter of the cup so that the two parts define between themselves an annular measuring chamber including a gap 3 having a radial width of approximately 1 mm. The flat top face 4 of the mass 2 is located in the interior of the cup 1 and the mass comprises an upwardly extending stem or shaft connected to suspension wire 6. The stem 5 is coaxial with the main body portion of the mass 2 and carries a torque indicating mirror 7. The upper end of the suspension wire is attached to a fixed support, not shown in FIG. 1. The lower end portion 8 of the cup 1 constitutes a coupling element which may be affixed to a turntable or an analogous driving element (not shown) driven by a suitable motor. The means for connecting the coupling element 8 to the turntable and for thereby driving the cup 1 comprises a radially extending pin or key 9. An annular flange 10 of the cup 1 comes to rest on the turntable when the latter is properly coupled to the element 8. The bottom surfaces of the cup 1 and mass 2 are parallel to each other in planes which are normal to the common axis of the cup and mass. The clearance between such bottom surfaces forms part of the aforementioned measuring chamber.

A sample of fluid whose viscosity requires determination is introduced into the gap 3 so that such fluid surrounds the bottom surface and the peripheral surface of the mass 2. The cup 1 is driven at a constant speed and the change in angular position of the mass 2 reflects the viscosity of tested fluid. Such viscosity will be indicated by the mirror 7 which can direct a beam of light onto a calibrated scale, not shown.

The viscometer of FIG. 1 will furnish satisfactory readings if the fluid fills the gap 3 exactly to the level of the top face 4 on the mass 2. However, if some fluid overflows a portion of or the entire top face 4, and remains in communication with the fluid filling the gap 3, the readings will be inaccurate because the surface tension of fluid will change at an unpredictable rate. Such irregularity is due to relative movement between the mass 2 and cup 1 because the fluid on the top face 4 is repeatedly sheared off from the fluid in the upper zone of the gap 3. The influence of such shearing action is particularly strong when the viscosity of fluid is very low and if the measurement must be carried out with a high degree of precision.

Presently known Couette viscometers are satisfactory when the desired accuracy of measurement is above 0.1 centipoise. More accurate measurements are unreliable, mainly due to surface tension of fluids in the measuring chamber which influences the tangential force at the periphery of the mass 2.

FIG. 2 illustrates a viscometer which embodies one form of the present invention. This viscometer is constructed with a view to prevent fluid overflowing the top face of the suspended mass 2 from interfering with the measurement. The top face of the mass 2 is not flat and horizontal, as in the conventional apparatus of FIG. 1, but is provided with a cavity 11 bounded by a conical surface which tapers downwardly and inwardly from the sharp annular edge 12 at the upper end of the peripheral surface of the mass. The top face of the cup 1 is provided with an annular cavity or groove 14 of triangular cross-sectional outline which tapers downwardly and outwardly from the sharp annular edge 13 at the upper end of the internal surface of the cup. The edges 12, 13 are located at the same level so that any fluid overflowing from the gap 3 will spill into the cavity 11 or groove 14 and will be fully separated from the sample in the gap 3. The angle between the peripheral surface of the mass 2 and the surface bounding the cavity 11 is an acute angle so that any fluid which overflows from the gap 3 automatically descends into the bottom zone of the cavity 11 and is separated from the remaining fluid. The angle between the internal surface of the cup 1 and the adjoining surface in the groove 14 is also an acute angle so that the fluid which rises above the gap 3 can overflow into the groove 14 and/or cavity 11. Since the edges 12, 13 are located at the same level and at the uppermost points of the cavity 11 and groove 14 fluid filling the gap 3 is invariably separated from fluids in the cavity 11 and groove 14. This groove is machined into an annular flange 16 at the upper end of the cup 1.

The viscometer of FIG. 2 further comprises a suction pipe 15 whose aspirating orifice 15' is located directly above the annular edge 13 so that it can evacuate fluid from the groove 14. The orifice 15' may be placed into the gap 3 at the desired level of fluid. Thus, the pipe 15 can evacuate fluid from the gap 3 so that this gap need not be filled all the way to the edges 12 and 13.

The manner in which the stem or shaft 5 of the mass 2 is suspended on wire 6 and in which the coupling element 8 may be driven by a turntable or the like is the same as described in connection with FIG. 1. The viscometer of FIG. 2 will furnish very accurate readings because the surface tension of surplus fluid cannot influence the testing of fluid which has been admitted into the gap 3.

The lower end portion 2' of the mass 2 shown in FIG. 2 resembles a cone which is received with clearance in the adjoining bottom portion of the cup 1 so that the measuring chamber of this viscometer comprises a cylindrical portion (gap 3) and a conical portion whose tip is located on the common axis of the mass 2 and cup 1. Such configuration of the mass 2 prevents air bubbles from remaining in the measuring chamber. The air bubbles can develop during admission of fluid into the gap 3. The maximum diameter of the conical end portion 2' equals the diameter of the cylindrical portion of the mass 2 and this end portion compensates for the cavity 11 and lowers the center of gravity of the mass so that the latter is better balanced.

In carrying out a test, the coupling element 8 of the cup 1 is connected to a turntable by means of the pin 9 so that the flange 10 rests on the top face of the turntable. The latter is driven at a constant speed which, however, may be varied depending on the type of test and the nature of fluid which is being tested. The pipe 15 is connected to a fan or another suitable suction generating device and tends to convey fluid in the direction indicated by an arrow a (FIG. 3). This pipe withdraws all surplus fluid and can actually evacuate the contents of the groove 14. As stated before, the aspirating orifice 15' of the pipe 15 can extend into or is located above the gap 3; in such apparatus, the pipe 15 can evacuate fluid from the gap 3 down to a desired level. The pipe 15 will continue to generate suction after the surplus of fluid is removed, and produces a current of air flowing along the top surface of fluid in the gap 15 to thereby keep such surface in motion and to prevent development of surface tension. It was found that such agitation of the fluid surface enhances the sensitivity of the viscometer.

The viscometer of FIG. 2 will operate satisfactorily if the groove 14 is omitted and if the flange 16 at the upper end of the cup 1 is provided with a chamfer 18 (see FIG. 3) bounding an inwardly and downwardly tapering conical inlet of the cup. This chamfer 18 terminates at the top face 17 of the flange 16 and makes an obtuse angle with the axis of the cup 1. Any surplus of fluid will overflow from the gap 3 into the cavity 11 in the top face of the mass 2 and the aspirating orifice 15' of the pipe 15 is placed adjacent to the chamfer 18 to evacuate any fluid that tends to creep up toward the top face 17 under the action of centrifugal force when the cup 1 rotates. If desired, the orifice 15' may be introduced into the top portion of the gap 3 to evacuate fluid from such gap down to a desired level.

The provision of the chamfer 18 facilitates proper mounting of the pipe 15 and insures that surface tension cannot interfere with the measuring operation. Furthermore, and as mentioned in connection with FIG. 2, the pipe 15 will cause a current of air to flow along the top surface of fluid in the gap 3, after the excess of fluid has been removed, to prevent development of surface tension.

In utilizing the apparatus of FIGS. 2 and 3, the operator will introduce successive samples into the measuring chamber wherein such samples are tested in response to rotation of the cup 1. The amount of fluid admitted into the measuring chamber is preferably such that the gap 3 is filled up to the upper edge 12 of the mass 2 whereby the orifice 15' of the pipe 15 withdraws any surplus and thereupon causes a current of air to flow along the exposed surface of fluid in the gap 3 to eliminate surface tension. The fluid may be admitted manually or by resorting to automatic metering devices of any known design.

The admission of a fresh sample can take place through the upper end of the gap 3 or through a bore extending axially through the coupling element 8 and flange 10 into the lowermost zone of the measuring chamber. Such bore may be connected with a valved conduit which can admit a predetermined amount of fluid at a time. The valve or valves in such conduit can be operated manually or by automatic controls.

The viscometers of FIGS. 2 and 3 will be utilized for intermittent determination of viscocity of successive samples of a fluid medium. However, it is often desirable to test the viscosity of fluid in a continuous operation, for example, to continuously test the viscosity of a fluid stream which is being obtained in a chemical or other plant. Such continuous determination of viscosity can be carried out in a viscometer which is illustrated in FIG. 4 and comprises a feed including a pipe 24 serving as a means for admitting a continuous stream of fluid into the lowermost zone of the measuring chamber. In this viscometer, the suction pipe 15 serves as a means for continuously evacuating fluid at the same rate at which the fluid is being supplied by the pipe 24 in the direction indicated by the arrow $b$. The fluid flows continuously from the lowermost zone into the uppermost zone of the measuring chamber and is evacuated by the aspirating orifice 15' at the top of the annular gap 3. The mass 2 is formed with an axial bore 21 whose lower end portion is located in the tip 23 of the conical bottom end portion 2'. The upper end portion of the bore 21 has several equidistant branches 22 which communicate with the conical cavity in the top face of the mass and are machined into an enlarged lower portion or boss 5' of the stem 5. The boss 5' enhances the rigidity of the stem in the region where the stem is weakened by the provision of branches 22.

The mass 2 further carries an annular partition or ring 19 which divides the cavity in the top face of the mass into an annular outer compartment 11' and an annular inner compartment 20. The latter has a conical bottom zone 20' which communicates with the branches 22. The discharge orifice 24' of the pipe 24 extends into the compartment 20 so that fluid admitted by the pipe 24 can flow through the branches 22, bore 21 and into the lower zone of the measuring chamber at the tip 23 of the conical end portion 2'. The outer compartment 11' performs the same function as the cavity 11 shown in FIG. 2 or 3. The orifice 24' of the pipe 24 can be located at a level above the partition 19 but it is normally preferred to place this orifice into the compartment 20 so that it is submerged in fluid admitted by the pipe 24. The means for supplying fluid to the pipe 24 is not shown in FIG. 4. Such fluid flows in the direction indicated by arrow $b$ and rises in the gap 3 under the action of centrifugal force and also due to capillary action. Once the fluid has risen to the annular edge 12 of the mass 2, it is being aspirated by the orifice 15' and is evacuated via pipe 15 as indicated by the arrow $a$.

The viscometer of FIG. 4 is especially suited for determining the viscosity of mineral oil and other homogenous fluids. However, if the fluid is blood serum or another fluid having large molecules, and particularly if the viscosity of the fluid is measured while such fluid undergoes chemical changes (for example, in the course of a reaction), macromolecules tend to accumulate in the conical lower zone of the measuring chamber and it takes a rinsing agent or solvent some time to move them upwardly and into the range of the aspirating orifice 15'. The deposition of large molecules in the bottom zone of the measuring chamber is prevented if the mass 2 is provided with a steep conical bottom end portion. In such apparatus, large molecules tend to deposit in the lowermost region and are more likely to be rapidly taken up and conveyed by the inflowing fluid.

Figure 5:
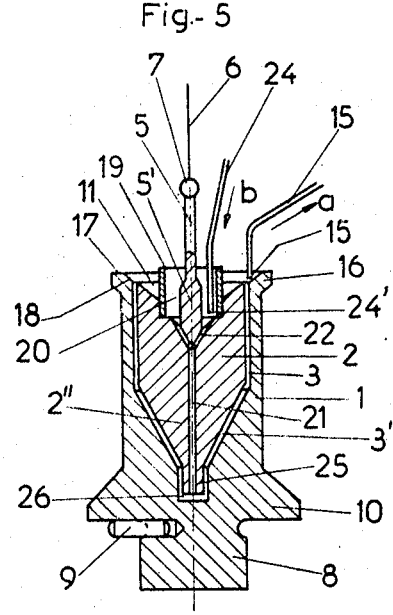
FIG. 5 is an axial section through a modified continuously operating viscometer.

In the viscometer of FIG. 5, the lower end portion 2'' of the mass 2 resembles a very steep cone. The upper portion of this viscometer is identical with that of the viscometer shown in FIG. 4. The angle at the tip of the cone 2'' is an acute angle and is preferably substantially less than 90 degrees. This cone has a downwardly projecting cylindrical extension or plug 25 which is received with clearance in the interior of the cup 1 to define therewith a small cup-shaped space 26 communicating with a conical gap 3' between the cone 2'' and the adjoining portion of the cup 1. The gap 3' in turn communicates with the gap 3 so that the measuring chamber comprises three interconnected zones 3, 3' and 26. The space 26 will accommodate sediments which descend from the downwardly tapering gap 3'.

Figure 6:
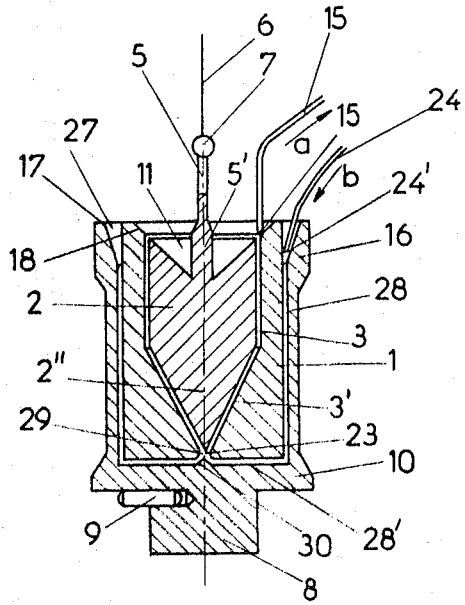
FIG. 6 is an axial section through a third continuously operating viscometer.

In the viscometer of FIGS. 4 and 5, fresh fluid is being fed through the mass 2 and into the bottom zone of the measuring chamber. FIG. 6 shows a viscometer wherein a fluid stream is admitted through the cup 1. The cylindrical wall of the cup 1 shown in FIG. 6 is thick so that it can be formed with a series of axially parallel feed channels or bores 28 extending downwardly from the bottom portion of an annular groove 27 machined into the top face 17 of the flange 16 and surrounding the chamfer 18. The groove 27 tapers downwardly and accommodates the orifice 24' of the feed pipe 24. The lower end portions of the vertical channels 28 communicate with radially extending channels or bores 28' which communicate with the bottom zone 29 of the measuring chamber below the tip 23 of the cone 2''. The cup 1 is formed with a small conical protuberance 30 which is disposed directly below the tip 23 and prevents accumulation of sediments in the zone 29. The sediments in the zone 29 would tend to remain therein and it would take some time before the freshly admitted fluid would dissolve and entrain such sediments into the gap 3 and into the range of the aspirating orifice 15'.

FIGS. 7a and 7b illustrate a viscometer which constitutes a modification of the viscometer shown in FIG. 6 and serves to permit separate admission of two or more different fluids which are being mixed and/or react with each other in the measuring chamber. This apparatus can be used to measure changes in viscosity in the courses of a reaction. The cylindrical wall of the cup 1 is so thick that the top face 17 of its flange 16 can be formed with a plurality of concentric grooves 27a, 27b, 27c each of which communicates with a set of vertical channels 28a, 28b, 28c. These channels respectively communicate with radially extending channels 28a', 28b', 28c' which discharge into the bottom zone 29 of the measuring chamber above the protuberance 30. The arrows $b1$, $b2$, $b3$ indicate the directions in which the orifices 24a', 24b', 24c' of the feed pipes 24a, 24b, 24c admit different fluids from separate sources into the grooves 27a, 27b, 27c. Each groove may receive fluid from two or more pipes. The orifices 24a', 24b', 24c' preferably dip into pools of fluid in the respective grooves. Each of the grooves 27a–27c may communicate with one or more channels 28a–28c.

The fluids which are admitted by the pipes 24a–24c are free to mix and react with each other only upon entry into the bottom zone 29 of the measuring chamber. Since the grooves 27a–27c are located at the level of the upper end of the gap 3, the fluids will rise automatically and, in response to rotation of the cup 1, they will be thoroughly intermixed and react with each other. The angular displacement of the mass 2 will indicate the rate at which the viscosity of the resulting fluid varies as the reaction progresses.

Figure 8:
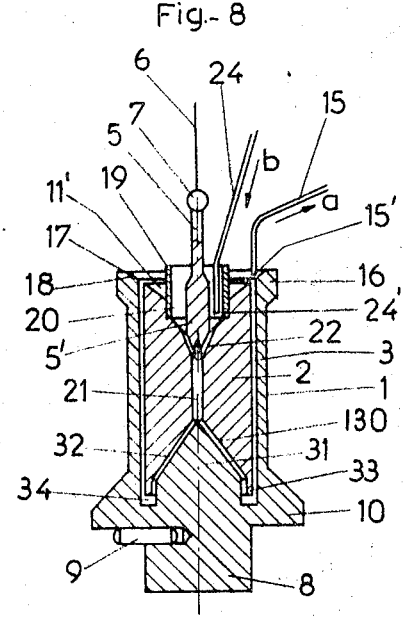
FIG. 8 is an axial section through a further continuously operating viscometer.

FIG. 8 illustrates a further viscometer whose upper portion is identical with that of the viscometer shown in FIG. 4 or 5. However, the lower end portion of the mass 2 is not of conical shape but is provided with a conical cavity 130 which receives with clearance a centrally located conical protuberance 31 of the cup 1. The conical gap 32 between the protuberance 31 and the surface surrounding the cavity 130 tapers upwardly and communicates with the lower end portion of the axial bore 21 which admits fluid supplied by the feed pipe 24. The maximum-diameter lower end of the gap 32 communicates with an annular space 34 at the lower end of the cylindrical gap 3, and this space 34 receives an annular extension or skirt 33 at the lowermost end of the mass 2.

The skirt 33 performs the same function as the extension or plug 25 of FIG. 5, i.e., it prevents accumulation of macromolecules in the measuring chamber.

Of course, the improved viscometer is susceptible of many additional modifications without departing from the spirit of the present invention. For example, the cavity 11 in the top face of the mass 2 and the chamfer 18 of the cup 1 shown in FIG. 3 may be replaced by a cone surrounding the stem 5 and having at its larger-diameter lower end an annular groove corresponding to the groove 14 of FIG. 2. In such apparatus, the aspirating orifice 15' of the pipe 15 will draw fluid from the groove in the mass.

Furthermore, the pin 9 can be replaced by other motion transmitting means, or the cup 1 may be connected directly with the output shaft of a synchronous motor or another suitable prime mover.

Though the viscometers of FIGS. 4 to 8 are designed for continuous measurement of viscosity, they can be utilized with equal advantage to determine the viscosity of successively admitted samples. As stated above, the admission of fluid or fluids can take place through the bore 21 of the mass 2 shown in FIG. 4, 5 or 8, or through the annular groove 27 or grooves 27a–27c provided in the flange 16 of the cup 1 as shown in FIGS. 6 and 7a, 7b. However, it is equally possible to admit the fluid through one or more bores provided in the cup 1 extending upwardly into the lower zone 29 of the measuring chamber. In the apparatus of FIGS. 7a and 7b, the admission of different fluids via feed pipes 24a–24c preferably takes place by resorting to automatic regulating devices which can admit fluids in a predetermined sequence, at predetermined intervals and in predetermined amounts. Of course, the apparatus of FIGS. 7a and 7b is equally suited for continuous or intermittent determination of viscosity of a single fluid which can be fed through one, two or all three pipes 24a–24c at a time and can be admitted continuously (as a stream) or in successive samples. As a rule, continuously admitted fluid will enter the lowermost zone of the measuring chamber and will rise therein to be evacuated at the upper end of the gap 3. In such continuous operation, the orifice 15' of the pipe 15 will evacuate the fluid at the same rate at which the fluid is being fed into the measuring chamber. The viscometer may comprise two or more pipes 15. Continuous determination of viscosity is often desirable in a refining plant for mineral oil wherein a small stream of mineral oil is being separated from the main stream to pass through the viscometer of FIG. 4, 5, 6, 7a–7b or 8.

Another important utilization of the improved viscometer is in various types of laboratories, for example, in biologic research, macromolecular chemistry, and others. A continuous stream of a fluid medium can be tested for viscosity in one of the apparatus shown in FIGS. 4–8, and the personnel in charge might add to such fluid medium another type of fluid at regular or irregular intervals to observe changes in viscosity which arise in response to reaction or during mixing of such fluids. A battery of two or more viscometers may be used simultaneously to determine the viscosity of two or more different fluids or the viscosity of a single fluid which has been processed in different ways or is being tested under different circumstances. The cup 1 can continue to rotate while the measuring chamber is being cleaned with a rinsing agent and/or solvent. Such rinsing agent and solvent can be admitted one after the other following admission of fluid to be tested and preceding admission of the next type of fluid. Also, one can use the viscometer of any one of FIGS. 4 to 8 to first determine the viscosity of a pure fluid, thereupon the viscosity of such fluid in admission with a reagent (without interrupting the admission of fluid and by using an apparatus of the type shown in FIGS. 7a and 7b), thereupon the viscosity of a washing fluid without interrupting the continuity of fluid flow through the apparatus, and again the viscosity of pure fluid to begin the same cycle for the second time. If the reagent is a solvent, its effect upon the viscosity of a given fluid can be examined and recorded on a continuous basis.

The apparatus of FIGS. 5 and 6 have been found to be especially suited for use in biological and macromolecular tests when the measuring chamber is to receive only one fluid at a time.

The results of measurements can be recorded in a number of ways. In all embodiments of my invention, the stem 5 of the mass 2 is shown as being provided with a mirror 7 which reflects a beam of light against a scale calibrated to furnish readings indicating the viscosity of fluid or fluids in the measuring chamber. More accurate readings will be obtained by resorting to an electric, electromagnetic or electromechanical compensating measurement wherein a readily determinable torque opposes angular displacement of the mass 2 in response to rotation of the cup 1. When the angular displacement of the mass 2 is zero, while the cup 1 rotates, the magnitude of torque necessary to maintain the mass in zero position is indicative of viscosity of the tested fluid or fluids. The compensating measurement can be carried out by hand or automatically, and the measurement may include automatic plotting of a curve, either by means of a stylus or by varying the intensity of light impinging on a photosensitive surface in accordance with variations of compensating torque necessary to maintain the mass in zero position. Still further, measurements obtained with my viscometer can be used to influence, either directly or indirectly, the process of producing or treating the fluid whose viscosity is being tested. Automatic regulating apparatus of such character are well known in the art.

The temperature of fluid may be maintained at a desired value by resorting to well known auxiliary equipment, for example, to a water bath or a thermostat-controlled air conditioned enclosure for the viscometer. The apparatus may further comprise heating and/or cooling means for the fluid.

It is further within the purview of my invention to reverse the direction in which the fluid is admitted into the measuring chamber. For example, and referring to FIG. 4, the fluid could be admitted into the upper part of the gap 3 and the pipe 24 could serve to evacuate fluid from the inner compartment 20. However, the admission of fluid into the bottom zone of the measuring chamber has been found to be more practical and is preferred in most cases. It is also possible to utilize a fixed cup 1 and to drive the mass 2 at a constant speed. The viscosity is determined by measuring the differences between the magnitude of forces necessary to rotate the mass 2 when the measuring chamber is empty and when this chamber is filled with a fluid. In such apparatus, the stem 5 of the mass 2 can be directly coupled to a motor.

It was found that the method and apparatus of my invention may be utilized in determining the viscosity of fluids with a very high degree of accuracy up to and even beyond $10^{-3}$ centipoises. Also, the apparatus can be used for determination of viscosity in liquid or gaseous fluids.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a method of determining the viscosity of fluids in a measuring chamber between a first surface and a second surface which is concentric with and surrounds the first surface, the steps of admitting a fluid to be tested into the measuring chamber; rotating one of the surfaces whereby the fluid tends to transmit to the other surface a torque whose magnitude is indicative of the viscosity of such fluid, and continuously aspirating the fluid above a predetermined level in the measuring chamber so as to maintain a constant fluid level in the measuring chamber and to continuously subject the exposed surface of the fluid in the measuring chamber to agitation so as to destroy the surface tension of the tested fluid at said exposed surface.

2. In a method as set forth in claim 1, wherein said rotating step includes driving said second surface at a constant speed, and further comprising the steps of suspending the first surface for rotation about the common axis of such surfaces and measuring the resistance offered by the first surface to rotation in response to torque transmitted by the fluid in the measuring chamber.

3. In a method as set forth in claim 1, wherein said rotating step includes driving said first surface at a constant speed, and further comprising the steps of fixedly holding said second surface, measuring the magnitude of force necessary to rotate the first surface when the measuring chamber contains a body of fluid to be tested, and comparing such force with the force necessary to rotate the first surface at the same speed when the measuring chamber is free of said fluid.

4. In a method as set forth in claim 1, wherein the fluid to be tested is admitted into the lowermost zone of the measuring chamber.

5. In a method as set forth in claim 1, wherein the fluid to be tested consists of several fluids which react with each other in the measuring chamber.

6. In a method as set forth in claim 1, wherein said fluid admitting step comprises introducing a continuous stream of fluid to be tested into the lowermost zone of the measuring chamber so that the thus admitted fluid rises to said predetermined level, said aspirating step comprising withdrawing the fluid at said predetermined level at the same rate at which the fluid is being admitted into said lowermost zone.

7. In a method as set forth in claim 1, wherein said fluid admitting step comprises introducing a continuous stream of fluid to be tested into the uppermost zone of the measuring chamber and further comprising the additional step of withdrawing the fluid at the same rate from the lowermost zone of the measuring chamber.

8. In a method as set forth in claim 1, wherein said fluid admitting step comprises introducing into said measuring chamber a continuous stream of fluid to be tested and further comprising the step of withdrawing such fluid from the measuring chamber at the same rate so that the chamber accommodates an unvarying supply of fluid.

9. In a method as set forth in claim 1, wherein said fluid admitting step comprises introducing into the measuring chamber a continuous stream of a fluid medium consisting of a plurality of fluids which are introduced in a predetermined sequence, and further comprising the step of continuously withdrawing the fluid medium from the measuring chamber so that the chamber accommodates an unvarying supply of such medium.

10. In a method as set forth in claim 9, wherein each of said plurality of fluids is a different fluid.

11. In a method as set forth in claim 10, wherein said different fluids include a first fluid and a solvent for such first fluid.

12. In a method as set forth in claim 10, wherein said different fluids include a first fluid and a rinsing agent for such first fluid.

13. In an apparatus for determining the viscosity of fluids, a first component comprising a container; a second component comprising a mass coaxial with and extending with clearance into said container to define therewith a fluid receiving measuring chamber; means for rotating one of said components whereby the fluid in said chamber tends to transmit to the other component a torque whose magnitude is indicative of the viscosity of such fluid; and aspirating means for continuously evacuating fluid above a predetermined level in said chamber for maintaining a constant fluid level in the measuring chamber and for continuously agitating the exposed surface of the fluid in the measuring chamber so as to destroy the surface tension of the tested fluid at said exposed surface.

14. A structure as set forth in claim 13, wherein said components have a common vertical axis and said container has a cylindrical internal surface, said mass having a cylindrical peripheral surface defining with said internal surface a cylindrical gap forming part of said measuring chamber.

15. A structure as set forth in claim 14, wherein said measuring chamber is of constant width.

16. A structure as set forth in claim 14, wherein said mass comprises a main body portion surrounded by said gap and a downwardly tapering conical lower end portion received with clearance in the adjoining portion of said container.

17. A structure as set forth in claim 16, wherein the angle at the tip of said conical lower end portion is less than 90 degrees.

18. A structure as set forth in claim 14, wherein said one component is said first component and wherein said second component further comprises a suspension wire for said mass.

19. A structure as set forth in claim 14, wherein said mass has a top face provided with a cavity to receive surplus fluid from said gap.

20. A structure as set forth in claim 19, wherein said cavity is bounded by a conical surface tapering downwardly toward said vertical axis.

21. A structure as set forth in claim 19, wherein said mass has an axial bore having an upper end portion in communication with said cavity and a lower end portion in communication with the bottom zone of said measuring chamber, and further comprising a feed for admitting fluid to be tested through said cavity and through said bore so that such fluid rises in the measuring chamber to said predetermined level and is evacuated by said aspirating means.

22. A structure as set forth in claim 21, wherein said second component comprises a stem coaxial with and extending upwardly from said mass and a suspension wire connected with said stem, said stem having a boss disposed in said cavity and the upper end portion of said bore having a plurality of branches extending through said boss and communicating with said cavity.

23. A structure as set forth in claim 21, further comprising partitioning means provided in and subdividing said cavity into an inner compartment communicating with said bore and arranged to receive fluid supplied by said feed, and an outer compartment surrounding said inner compartment and arranged to collect eventual surplus of fluid overflowing from said gap.

24. A structure as set for th in claim 14, wherein said mass comprises a cylindrical main body portion surrounded by said gap and a downwardly tapering conical lower end portion, said lower end portion having a coaxial extension projecting downwardly therefrom and received with clearance in the adjacent portion of said container.

25. A structure as set forth in claim 14, wherein said container has a top face provided with a concentric annular groove bounded by a surface defining with said internal surface an acute angle, said groove being arranged to receive eventual surplus of fluid which overflows from said gap.

26. A structure as set forth in claim 14, wherein said container has a top face provided with a chamfer tapering downwardly and inwardly toward said internal surface.

27. A structure as set forth in claim 26, wherein said chamfer and said vertical axis make an obtuse angle.

28. A structure as set forth in claim 14, wherein said container has a top face provided with at least one concentric annular groove and channel means connecting said groove with the bottom zone of said measuring chamber, and further comprising a feed for admitting fluid to be tested into said groove whereby such fluid passes through said channel means and rises in the measuring chamber to said predetermined level to be evacuated by said aspirating means.

29. A structure as set forth in claim 28, wherein said top face is provided with a plurality of concentric grooves and said container has a plurality of separate channel means each connecting one of said grooves with the bottom zone of said measuring chamber, said feed comprising separate devices for admitting fluid to said grooves.

30. A structure as set forth in claim 14, wherein said mass has top and bottom faces each provided with a conical cavity and an axial bore connecting said cavities, said container having a conical protuberance extending with clearance into the cavity of said bottom face and further comprising a feed for supplying fluid to be tested into the cavity of said top face whereby such fluid passes through said bore and rises in the measuring chamber to said predetermined level to be evacuated by said aspirating means.

31. A structure as set forth in claim 14, wherein said one component is said first component and further comprising a suspension wire connected with said mass and means provided on said mass for indicating its angular displacement in response to torque transmitted thereto by fluid in said chamber when said container rotates with reference to the mass.

32. A structure as set forth in claim 13, wherein said aspirating means comprises a suction pipe having an orifice disposed at the desired level of fluid in said chamber.

33. A structure as set forth in claim 13, wherein each of said components has a top face one of which is provided with a cavity communicating with the bottom zone of said measuring chamber, and further comprising a feed for supplying fluid to be tested into said cavity whereby such fluid rises in the measuring chamber to said predetermined level and is evacuated by said aspirating means.

34. A structure as set forth in claim 33, wherein said feed comprises at least one fluid admitting pipe.

References Cited

UNITED STATES PATENTS

| | | | |
|---|---|---|---|
| 2,074,174 | 3/1937 | Goodier | 73—60 |
| 2,303,162 | 11/1942 | Godwin et al. | 73—60 |
| 2,752,778 | 7/1956 | Roberts et al. | 73—60 |
| 2,792,912 | 5/1957 | Kangas | 184—103 |
| 2,796,758 | 6/1957 | Myers et al. | 73—60 |
| 2,958,220 | 11/1960 | Kalish | 73—53 |

OTHER REFERENCES

Eveson, G. F., and Hall, E. W.: A Continuous-Flow Rotational Viscometer for Use With Downward-settling Suspensions, in Journal of Scientific Instruments, 33, pp. 110–112, March 1956.

LOUIS R. PRINCE, Primary Examiner

JOSEPH W. ROSKOS, Assistant Examiner